INVENTOR.
JOSEPH PATRICK SWEENEY
LAWRENCE GREBE WILEY
BY Curtis, Morris & Safford INVENTOR.
JOSEPH PATRICK SWEENEY
LAWRENCE GREBE WILEY
BY Curtis, Morris & Safford

MAGNETIC BINARY SEQUENCE DETECTOR

Filed April 1, 1965

INVENTOR.
JOSEPH PATRICK SWEENEY
LAWRENCE GREBE WILEY
BY Curtis, Morris & Safford

MAGNETIC BINARY SEQUENCE DETECTOR

INVENTOR.
JOSEPH PATRICK SWEENEY
LAWRENCE GREBE WILEY
BY Curtis, Morris & Safford

MAGNETIC BINARY SEQUENCE DETECTOR

INVENTOR.
JOSEPH PATRICK SWEENEY
LAWRENCE GREBE WILEY
BY Curtis, Morris + Safford United States Patent Office 3,444,532

Patented May 13, 1969

3,444,532
MAGNETIC BINARY SEQUENCE DETECTOR

Joseph Patrick Sweeney, Progress, Harrisburg, and Lawrence Grebe Wiley, Camp Hill, Pa., assignors to AMP Incorporated, Harrisburg, Pa.

Filed Apr. 1, 1965, Ser. No. 444,714
Int. Cl. G11b *5/00;* G06f *7/02*
U.S. Cl. 340—174 12 Claims

ABSTRACT OF THE DISCLOSURE

A binary code sequence detector is disclosed featuring a magnetic core register wired so as to advance a single ONE bit from the first core to the last core of the register to produce an output signal in response to a proper code input and to effectively block such advance in response to an improper code. A binary code input formed of a sequence of ONE and ZERO bits is caused to energize selective advance drivers to provide advance pulses for the register which are linked to register cores in patterns associated with a given sequence to be detected. In a word detector embodiment improper sequences are blocked by not cancelling an advance pulse generating a clearing MMF on a given core. In a code stream detector improper sequences are blocked by selectively applying a clearing MMF on a given core to override a transmitted bit and prevent the core from being set.

This invention relates to binary sequence detectors.

It is one object of the invention to provide a magnetic core sequence detector adapted to respond to one of a large number of binary codes.

It is a further object to provide a sequence detector circuit which requires no stand-by power.

It is still a further object to provide a sequence detector with an intelligence handling and manipulating register which utilizes the sequence signals for drive.

It is another object to provide a binary sequence detector which is programmable to recognize any one of a large number of binary codes.

It is still another object to provide a magnetic sequence detector register which is compact and relatively inexpensive, as compared to prior art devices of similar function.

It is still another object of the invention to provide a drive circuit for a magnetic sequence detector register which utilizes few components and is operable with a high degree of electrical efficiency.

The present invention contemplates the provision of a magnetic core register wired so as to successfully advance a tag bit throughout the register length in response to a proper code, and to effectively preclude a completed advance of such bit through the register in response to an improper code. The magnetic core register, as wired, forms one aspect of the invention; and the register, in conjunction with a novel drive circuit, forms a further aspect of the invention. The invention herein described is taught in an embodiment devised for code stream detection and in an embodiment devised for word detection, the distinction being that code stream data may contain a detect sequence at any point in a stream of signals, whereas word detection requires that the detect sequence be contained in a finite bit length related to the capacity of the register.

Figure 1:
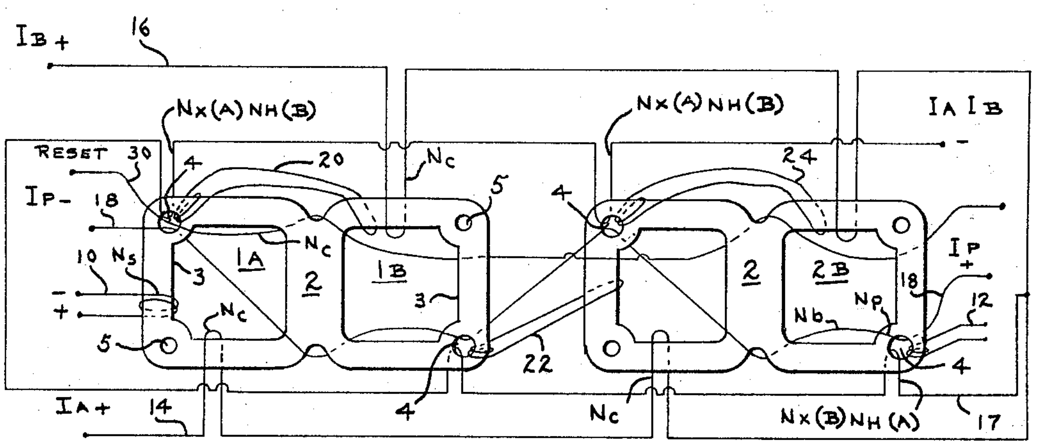
FIGURE 1 is a schematic diagram showing two specially-shaped cores wired in accordance with the control and transfer technique employed by the register of the invention, and is included to explain the more specific embodiments of word and code stream detectors embodying the invention.
Figure 2:
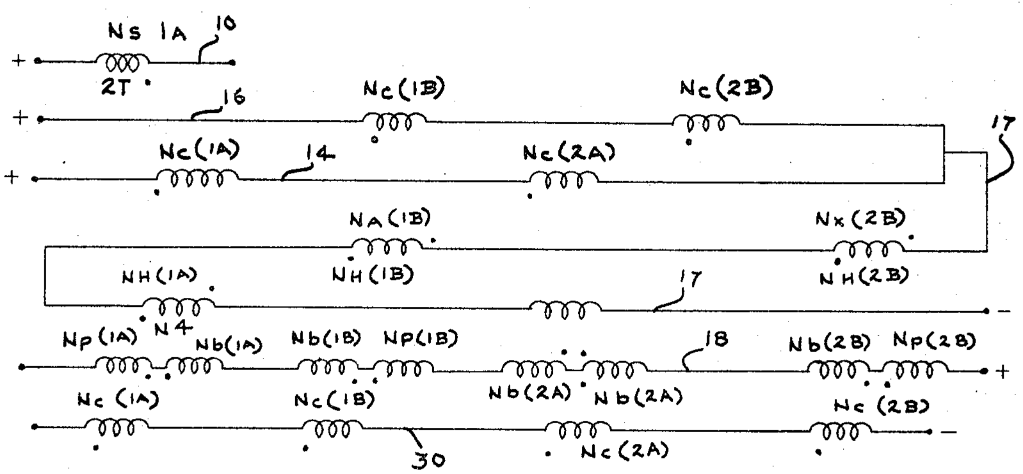
FIGURE 2 is a wiring diagram of the circuit of FIGURE 1 included to explain the representations given in the description relative to the specific embodiments of word and code stream detectors.

Referring now to FIGURES 1 and 2, the circuit thereshown is adapted to transfer intelligence through the bit positions 1A, 1B, 2A, 2B, in response to an appropriate application of driving pulses developed on the leads associated with clearing and priming drive pulses. A detailed description of the type of circuit of FIGURE 1 is found in copending application, Ser. No. 305,780, filed Aug. 30, 1963, in the names of David Nitzan and Joseph P. Sweeney, entitled Multi-Aperture Magnetic Core Device.

In brief summary, the cores 2 for the bit positions 1A–2B are of square loop, magnetic material which may be driven into saturation in a negative sense to define an intelligence content of binary ZERO, and driven in an opposite sense to substantially saturate the inner leg or half of the core material to represent the intelligence bit binary ONE. Each core 2 includes a pair of major apertures 3, a pair of transmitting apertures 4 and a pair of receiver apertures 5. Input to the device is accomplished through pulses applied to the input lead, shown as 10, and output is derived from flux changes under the output lead shown as 12. The input of a ZERO is accomplished by application of zero voltage or a substantially reduced voltage level, such that the current flowing in the linking turns results in an MMF insufficient to switch inelastic flux in the core. The input of a binary ONE is accomplished by the application of a voltage to lead 10 sufficient to develop a current, and MMF to switch approximately half the flux of the core in a positive sense. An output on lead 12 is sensed by any device capable of responding to the substantial voltage or level developed if the core defining bit position 2B is driven and contains a ONE and not responding to the insubstantial voltage level if the bit position 2B contains a ZERO.

Drive and transfer throughout the register is accomplished through the predetermined application of, what may be called, advance or clearing pulses which are of substantial level and short duration in conjunction with priming pulses which are of relatively low amplitude and long duration. The advance or clearing pulses are applied in sequence to the leads, shown as 14 and 16, and the priming pulses are applied alternatively to the lead shown as 18. This sequence is normally a first application of a priming pulse of current $I_p$ to slowly prime available flux under the coupling loop turns followed by an application to the same core of an advance pulse of current 1A or 1B to rapidly switch any flux primed under such coupling loops. These loops are shown as 20, 22 and 24 linking the core-transmitting apertures to the next succeeding core. If a ONE is being transferred, a substantial current is developed effecting an MMF sufficient to set the succeeding core, and if there is a ZERO in registry an insubstantial current is developed which is insufficient to set substantial flux in the succeeding core.

A reset winding 30 is provided linking all bit portions with turns adapted to clear all cores and insert an all ZERO bit content when such is desired; e.g., on start up to prepare the register for use.

While the cores are shown in a form such that a single physical core accommodates two bit positions, it is contemplated that single cores may be utilized. In conjunction with the circuit shown in FIGURE 1, reference is made to the wiring diagram of FIGURE 2 showing the various turns employed with the appropriate polarity or sense. Thus, with respect to lead 10, which is adapted to input intelligence into the register, the turns are shown as $N_S$ which means that an application of a substantial pulse in the polarity, shown in FIGURE 1, will set the associated core. Note that, in FIGURE 2, the turns $N_S$ associated with bit position 1A contain a small dot which is related to the sense of the turn as applied to the core. With respect to the advance leads 14 and 16, it will be apparent that the turns are denominated $N_C$ with the dot oppositely positioned to indicate that the turns are clearing in the sense of application of MMF developed responsive to a pulse being applied thereto. It will be observed that the leads 14 and 16 are commoned to a further lead 17, which threads back through the transmitting apertures of each bit position to form turns denominated $N_X$ and $N_H$. The turns $N_X$ and $N_H$ are in a sense to clear the material surrounding the lead through the application of the MMF developed through a pulse on lead 17. As explained in the Nitzan et al. application above-mentioned, the particular turn threading the transmitting aperture and related to lead 17 operates in an $N_X$ sense to aid the MMF clearing the same core, and to hold or oppose any MMF tending to set a preceding core during the application of an MMF through the turns on the associated advance windings. For example, the application of an advance pulse 1A on lead 14 will operate to apply clearing MMF to the core material in bit positions 1A and 2A, and simultaneously through a branch of lead 17 apply an MMF to turns linking the transmitting aperture of the same core and operating as $N_X$ turns which clear the material about the transmitting aperture. Also, this same pulse will operate through what becomes $N_H$, turns the transmitter apertures of cores 1B and 2B to hold the material surrounding the turns from being switched by any back-MMF developed in the coupling loops 22 and 12.

The prime winding 18 threads the cores through turns $N_P$ operating on the transmitting aperture material and turns $N_B$ threading the core major apertures. The turns $N_P$ operate to effect the priming function to switch flux under the coupling loops in a proper sense such that, as the cores are cleared, the same flux develops a voltage and current in the coupling loop representing the intelligence state of the core. The turns $N_B$ operate to bias the same core in a sense opposite to the MMF developed by turns $N_P$ to prevent the priming current from spuriously setting the same core by switching about the core major aperture.

In FIGURE 1, the various windings include a single turn in each instance, except for the coupling loop which includes two turns on the transmitting aperture outer leg and one turn on the receiving aperture major leg. In practice, the various turns may be adjusted in accordance with the particular current levels employed and the particular resistance values of the leads. With respect to the cores shown in FIGURE 1, if the material soft clear threshold is approximately 250 ma. with respect to clearing the core from a set state, the particular turns for such are denominated in FIGURE 2 in the manner shown with respect to the turns on lead 10 for $N_S=2T$.

From the foregoing it should be apparent how intelligence in binary form is inputed, transferred and outputed relative to the circuit. It is possible to assure a transfer through the circuit of FIGURE 1 by the appropriate application of driving pulses in proper sequence and of proper amplitude in the manner described in the Nitzan et al. application above-mentioned. It is also possible to preclude the transfer of intelligence through the register device and thus block an output therefrom by interrupting any one of the various drives necessary to effect such transfer. This interruption may be accomplished at any time between an initial setting of the core material in bit position 1A and the final transfer from the core material in bit position 2B. For example, assuming that a ONE is set into position 1A and transferred to 1B and then to 2A, the omission of a pulse on lead 18 to prime the flux under the coupling loop 24, followed by the application of an advance pulse on lead 16, will destroy the intelligence therein by clearing out the material in bit position 2A without transferring the ONE level to bit position 2B and no output will result on lead 12 on the next succeeding application of an advance pulse on lead 16. In the same manner and under the same circumstances, the failure or omission of an advance pulse on lead 14, followed by the application of a clearing MMF applied through reset lead 30, will effectively destroy the intelligence stored in bit position 2A, since the turns $N_C$ of lead 30 are also applied to bit position 2B to hold the core material in such position clear, notwithstanding the attempt to transfer via coupling loop 24.

With the foregoing description now in mind, the invention may now be explained in similar terms using similar cores, windings, and pulse features to effect the detector function in a novel manner. Before going into this, it is worth noting that techniques of blocking the effective transfer of intelligence from being outputed from a core device have been employed in sequence detection, or in steering or routing of intelligence through decoding trees and the like. Pertinent examples are shown in U.S. patents including No. 3,150,354 to W. G. English, granted Sept. 22, 1964; No. 3,081,453 to D. Nitzan, granted Mar. 12, 1963; No. 3,122,645 to M. Green, granted Feb. 25, 1964; and No. 3,056,116 to H. Crane, granted Sept. 25, 1962. The present invention represents a novel extension and variation of these techniques to provide a sequence detector capable of both word and code stream detection, which is considered to be simpler and more reliable than the prior art devices. The invention also improves upon prior art devices by requiring a substantially reduced degree of synchronization without the non-operating power required by these prior approaches.

Figure 3:
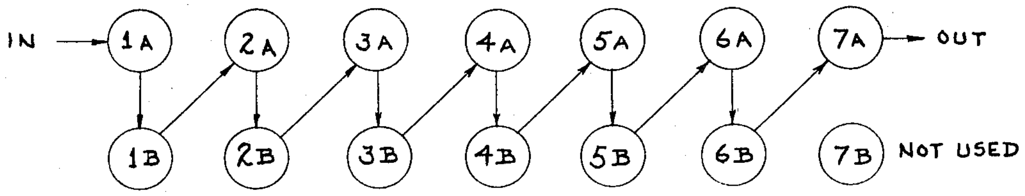
FIGURE 3 is a schematic diagram of a word detector showing the arrangement of bit positions preferred.
Figure 4:
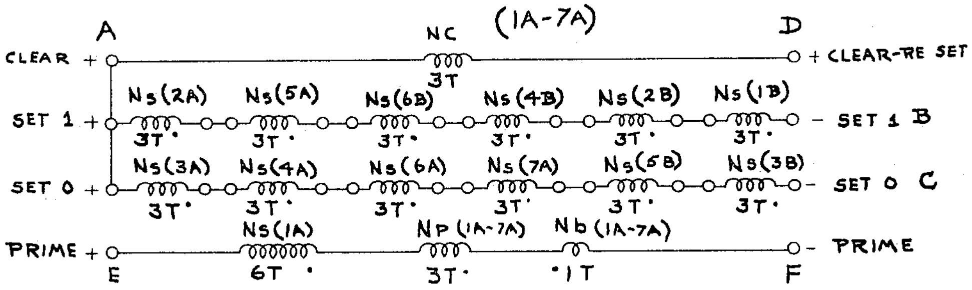
FIGURE 4 is a wiring diagram for the device of FIGURE 3.

Turning now to specific embodiments of the invention and referring to FIGURES 3–6, there is shown a twelve bit word detector. The detection of words may be considered as a technique wherein one of a large number of possible binary codes inputed to a detector produces an output with the remaining codes of the family producing no output. More broadly, a word detector discrimates between a large number of words to produce distinctly different outputs in response to the application and input of detect and non-detect words. In FIGURE 3, the input of the ONE-ZERO code, 1–1–1–0–0–0–1–1–0–0–1–0, will produce an output, and the input of any of all other twelve bit ONE-ZERO combinations will produce no output. In other words, a single code of a large number of possible codes will be detected. The word detector of FIGURE 3 includes seven cores such as 2, previously described, forming bit positions 1A–7A, the position 7B being unused. The windings for these cores are generally, as described above, to transfer a ONE serially from bit position 1A to bit position 7A and the output from the register. The specific circuit is shown in FIGURE 4 with the various $N_X$ and $N_H$ turns omitted for clarity, although such are preferred to improve the range of operation of the circuit. The coupling loops have also been omitted for clarity, but would be as indicated in FIGURE 1 and as shown schematically by the arrows between bit positions in FIGURE 3.

Figure 5:
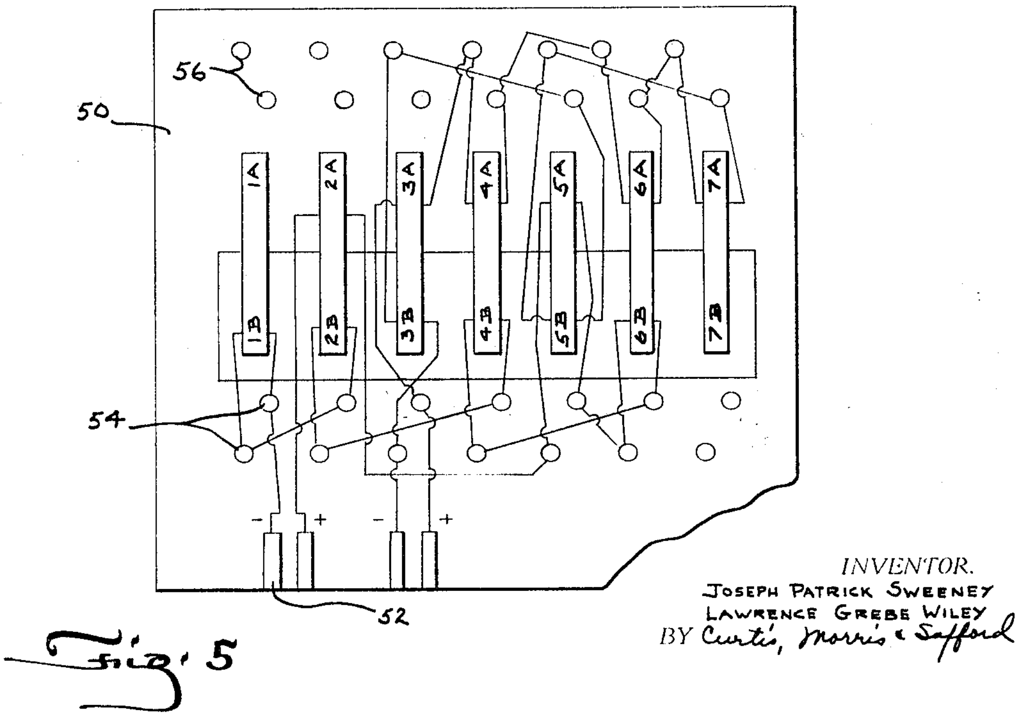
FIGURE 5 is a schematic diagram showing the physical arrangement of cores and terminals to develop distinct sequences for detection and operation of the circuit of FIGURES 3 and 4.

FIGURE 5 shows, in part, a preferred packaging scheme for the circuit of FIGURES 3 and 4, which permits the code sequence to be detected to be changed by the choice of windings. The various cores are mounted end-on with apertures aligned on a printed circuit card 50 having edge terminals 52 on one side thereof, with rows of terminals 54 and 56 extending along one side of the cores. The circuit of FIGURE 4 or any other coding is accomplished by connecting the various terminals 54–56 in a desired pattern through the cores. Thus, for the detect code which begins 1–1 . . . and first bit position fed by the turns of FIGURE 4 shown as $N_S$(1B), a length of wire is looped three times (3T) through the core bit position 1B (major apertures) and terminated to the adjacent posts 54 as by soldering. The remaining lower bit positions are supplied by turns which are carried from the various posts to the various cores returning to a post 54. These posts are terminated by printed circuit or separate leads to the edge terminals 52. The remaining upper bit position turns are installed in a similar manner to posts 56. To change the code sequence to be detected, the loops of wire may be separated from the posts, removed from the cores, and replaced in an alternative appropriate pattern. If, for security reasons, it is desired to permanently fix the circuit, a layer of liquid silicon rubber may be deposited on the various posts, cores and windings. When the silicon has set up, the circuit will be potted to an extent exceedingly difficult to remove without destroying the various windings.

Figure 6:
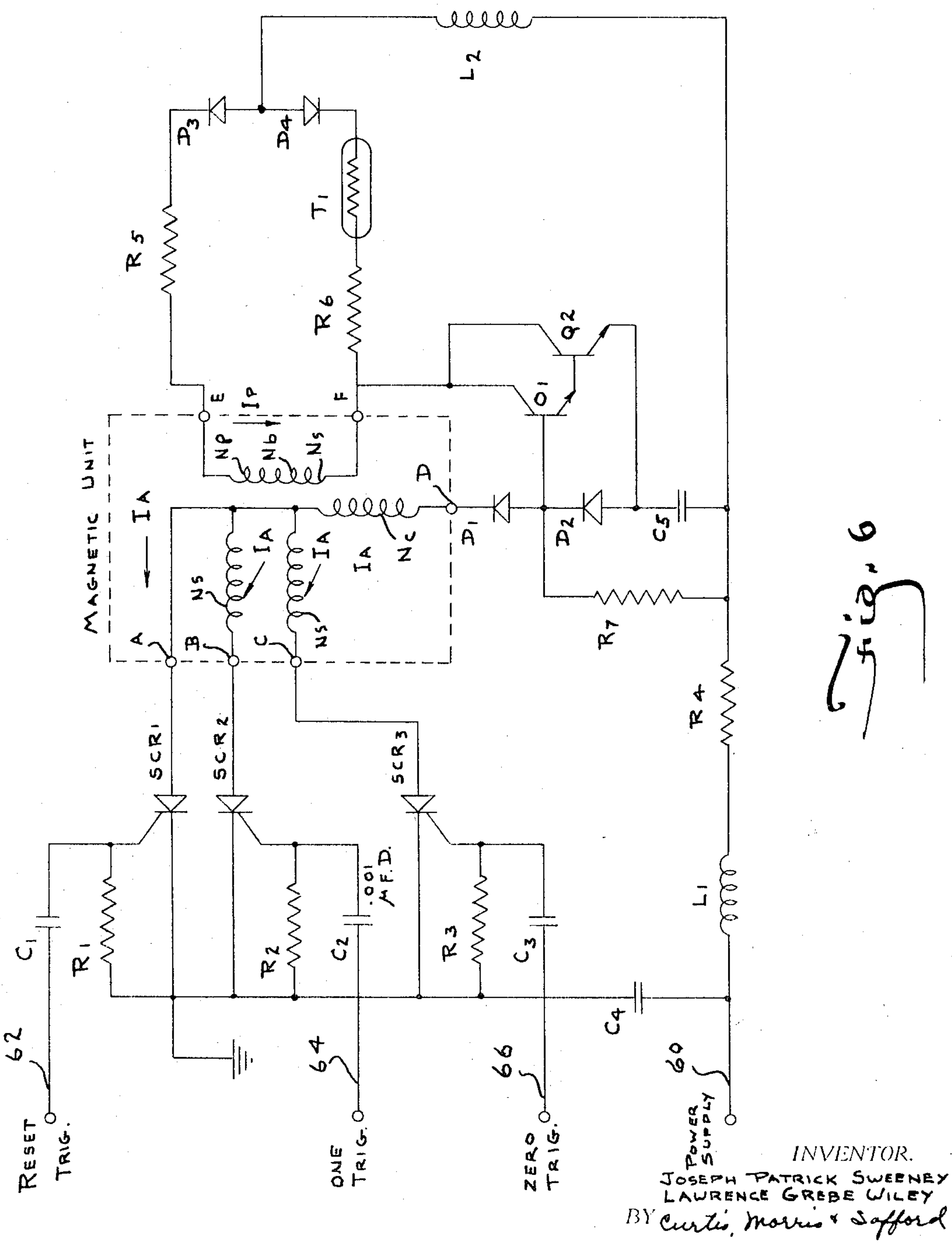
FIGURE 6 is a schematic diagram of the driver and trigger circuit for the word detector of FIGURES 3, 4 and 5.

The remaining components of the drive circuit, shown in FIGURE 6, may also be mounted and potted on the printed circuit card 50 and terminated to contacts 52 so that the detector is essentially a one-piece unit which may be plugged into a standard edge connector rack. The arrangement of terminals 54–56 may be as shown, or alternatively placed on the same side of the cores, or may be placed on opposite sides of the card 50 for convenience.

Referring now in further detail to the word detector of FIGURES 3–6, reference is made to the correspondence between FIGURES 4 and 6 at common points A, B, C, D, E and F. The magnetic unit, shown in FIGURE 6, comprises the cores and windings shown in FIGURES 4 and 5, arranged to be driven by the surrounding circuit to operate as a word detector. The surrounding drive circuit includes four input leads 60, 62, 64 and 66 which are connected on the detector card 50 through available edge contact terminals. In addition to this, the magnetic unit includes an output lead (not shown), from which the detect output signal is developed. There is no separate magnetic unit input, as such is accomplished through the driver leads 64 and 66.

The lead 60 represents an input source of power which may be from a battery or some other D.C. supply. The lead 62 represents a clear reset input similar in function to the lead 30, hertofore described, relative to the circuit of FIGURE 1. The leads 64 and 66 are from intelligence input triggers connected, respectively, to ONE or ZERO pulse sources which are, in turn, driven by the word code being sampled. The word code being sampled is broken down by means external to FIGURE 6, with the ONE and Zero bits thereof being routed to the appropriate lead 64 or 66. Bit separating of this type is a standard procedure and may be accomplished by a number of suitable means capable of sensing the occurrence of a ONE or ZERO and producing a trigger pulse in response thereto on separate leads.

Following now the operation of the magnetic unit and the driver circuit and assuming the detect sequence previously mentioned, we begin with a first energization of lead 62 which may be by a manual or electronic switch to provide a trigger pulse to the base of SCR1 through an isolation capacitor $C_1$. SCR1 then fires to draw current $I_A$ from 60 through the pulse-shaping elements L1, R4 and C5, diodes $D_1$ and $D_2$, and the turns $N_C$ to ground. This current flows through the turns $N_C$ in the circuit D–A to develop an MMF which clears all of the cores 1A–7A, and the diode $D_1$ prevents excessive overshoot of $I_A$ which would tend to set the cores. While $C_5$ is charging, the polarity of voltage forward-biases the diode $D_2$ which back-biases the collectors of transistors $Q_1$, $Q_2$ to hold such off. As $C_5$ becomes fully charged, SCR1 cuts off and starts to discharge through $D_2$ which blocks and becomes biased to cause the transistors $Q_1$ and $Q_2$ to be turned on by the base supply from $R_7$ to conduct and discharge $C_5$. This develops a current $I_p$ through pulse-shaping elements $L_2$ and $R_5$, diode $D_3$, the priming turns $N_p$, $N_b$ and $N_S$ (points E–F), the transistors $Q_1$ and $Q_2$ and back to $C_5$. The branch, including the diode $D_4$, $R_6$ and the thermistor $T_1$, operate to vary $I_p$ in the presence of temperature changes. The resulting MMF operates to prime all of the cores containing a ONE through the turns $N_p$ and to set the core of bit position 1A, via the turns $N_S$ as shown in FIGURE 4. The bit in position in 1A may be thought of as a tag bit, as distinguished from the intelligent bits forming the code to be detected. At this time, the cores of the remaining bit positions are not affected since priming will only occur if a core is set.

At this point then, core 1A is set and primed and all other cores are clear, all prior to the receipt of the first bit of the code sequence.

Assuming now that the first bit of a code word is a ONE (which is correct as to the proper detect sequence), lead 64 will be pulsed through isolating capacitor $C_2$ to cause SCR2 to fire and draw current $I_A$ to charge $C_5$ through turns $N_S$ and $N_C$ (circuit points D–B). From FIGURE 4, it will be apparent that the turns $N_C$ will apply a clearing drive to bit position 1A. Since 1A is set and primed, a ONE will be transmitted therefrom to bit position 1B. The turns $N_S$(3T) and $N_C$(3T) on the core and bit position 1B are equal, and the net MMF applied thereto by $I_A$ is zero to thus permit the receipt of the ONE transmitted from 1A and a setting of 1B.

At this point, the capacitor $C_5$ will again discharge through the priming current (E–F) to prime the core of bit position 1B and again set and prime the core of bit position 1A. The effect of all this is to advance a ONE to 1B toward the output position 7A.

Assuming now that the second code bit is also of the correct content for the detect sequence, lead 64 will again be pulsed. The foregoing operation will occur with a ONE being transferred to position 2A. If the next input is also a ONE, the bit will be transferred to position 2B.

Now the detect code wired into the register is from FIGURE 4, 1–1–1–0–0–0–1–1–0–0–1–0, so the next or fourth bit must be a ZERO in accordance with desired operation. Assuming that it is, lead 66 will be pulsed to fire SCR3 and cause $I_A$ to flow through the $N_C$ and $N_S$ turns (points D–C) changing $C_5$ as before. The turns $N_C$ will cause the ONE in 2B to be transferred to 3A, and the MMF developed by turns $N_C$(3T) on core 3A will be cancelled by the MMF developed by turns $N_S$(3T) thereon to permit the intended setting of the core of the bit position. There is now a ONE in 3A and the next proper bit is again ZERO.

Assume now that instead of ZERO, the next or fifth bit input is a ONE. This will energize lead 64 which causes the turns $N_C$ to clear the core of bit position 3A to transmit to 3B; but note that lead 64 drives the $N_S$ windings (via points D–B) which, in accordance with the circuit of FIGURE 4, do not link 3B. This means that no MMF will be developed therein to cancel the effect of the $N_C$ turns which link 3B. This means that the $N_C$ turns will hold the core of 3B clear to thus block the successful transfer thereto from 3A.

Now, since there is no bit in 3B successive bit inputs of the word, even through correct, will not produce a detect output in the remaining six input bits. In accordance with word detector operation, each word is preceded or succeeded by a pulse to lead 60 which resets or clears out the register so that a single improper bit will result in a failure to produce a detect output.

The code stream detector of the invention, as shown in FIGURES 7–10, includes an array of cores similar in geometry and arrangement to the previously-described word detector. The object is also similar in that ONE-ZERO intelligence bits are constantly scanned for a detect sequence. The difference is that the code stream detector will produce an output if the proper sequence occurs at any point in the stream.

Figure 7:
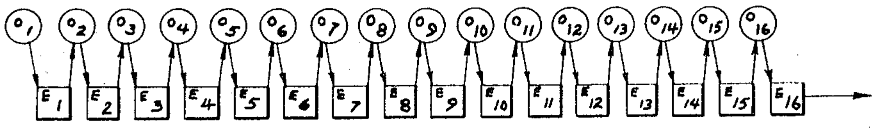
FIGURE 7 is a schematic diagram showing the bit position and intelligence routing for a code stream detector in accordance with the invention.
Figure 8:
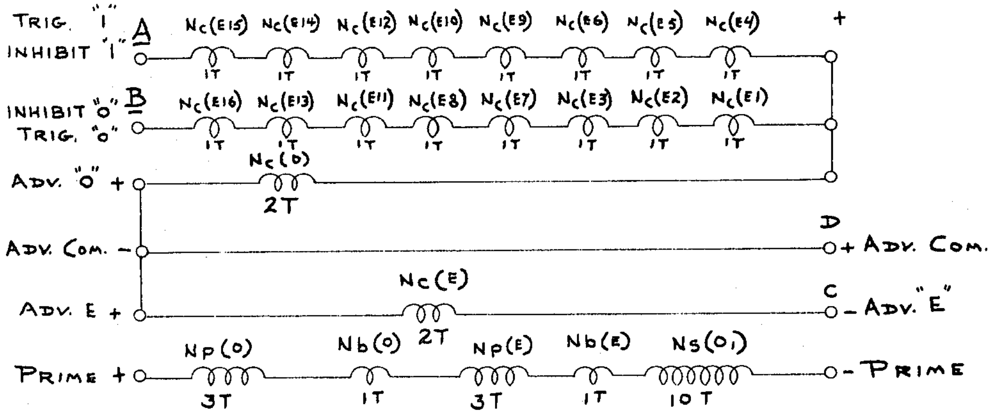
FIGURE 8 is a wiring diagram for the device of FIGURE 7.
Figure 9:
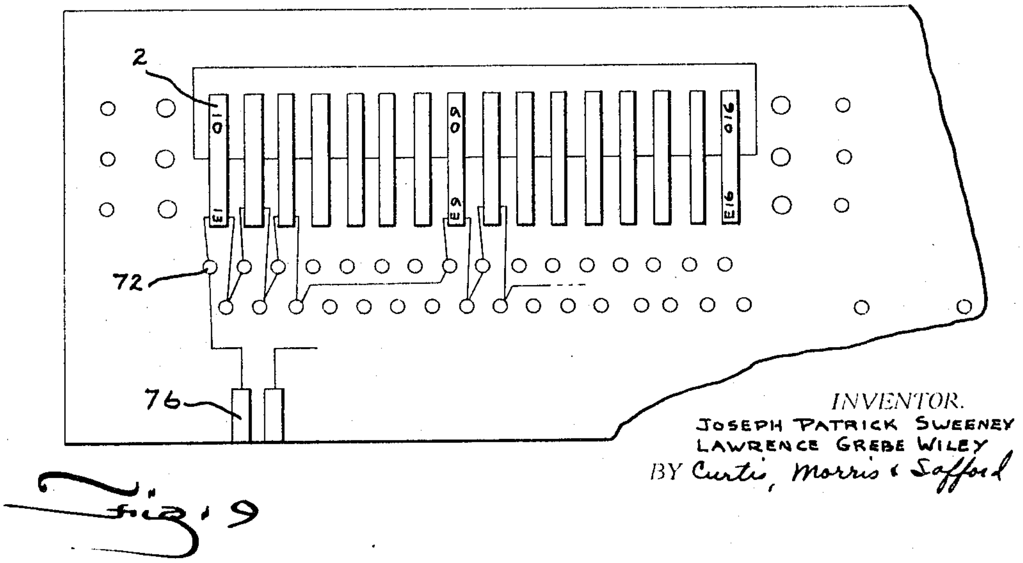
FIGURE 9 is a diagram of the physical arrangement of cores and terminals for use with the device of FIGURES 7 and 8.

In FIGURE 7, sixteen bit positions for a sixteen bit code are included and are arranged in the usual, odd-even scheme with transfer serially from core to core, $O_1$ to $E_1$, $E_1$ to $O_2$, etc. The cores of the bit positions are pattern-wired into sixteen cores 2, mounted as previously described, on a printed circuit card shown as 70 in FIGURE 9. The pattern-wiring is by loops from posts, such as 72, to edge terminals 76 in accordance with the winding schedule in the upper-half of FIGURE 8; as indicated in FIGURE 9 by the five exemplary loops shown. As distinguished from the word detector, the coding is carried out in only half of the cores of the various bit positions, and the code windings are all in a clearing sense rather than in a setting sense. The remainder of the drive windings are inserted axially through the array of cores, as arranged in FIGURE 8. These include standard advance or clearing windings ADVO and ADVE, and prime windings for the $N_p$, $N_b$ function, with an additional setting winding $N_S$ for core $O_1$.

Figure 10:
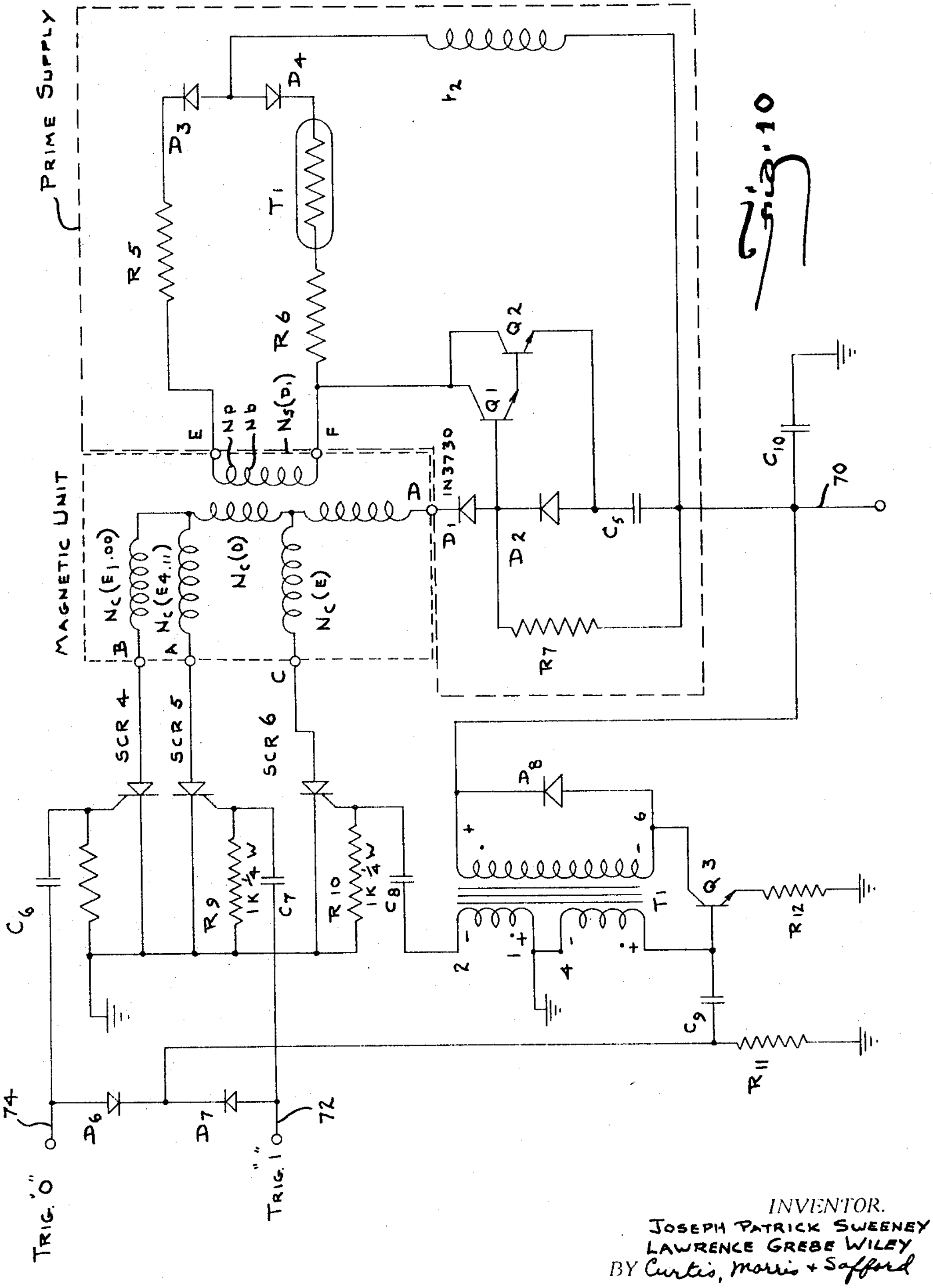
FIGURE 10 is a schematic diagram showing the driver and trigger circuit in conjunction with the detector of FIGURES 7, 8 and 9.

Turning now to the drive circuit of FIGURE 10, the correspondence with the magnetic unit is indicated by points A, B, C, D, E, and F. The circuit includes a power supply input lead 70, which may be a battery or other source, and trigger ONE and trigger ZERO input leads 72 and 74. These leads are supplied by some external means which develop separate pulses from the code stream being sampled by the circuit. That part of the circuit, labeled prime supply, is identical to the circuit described relative to FIGURE 6, and no further description of the details of the elements will be given. Also, the capacitor-resistor elements, $C_6$–$R_8$, $C_7$–$R_9$, $C_8$, $C_{10}$, operate as described and will not be again detailed.

Assuming now a detect sequence of the sixteen ONE-ZERO bits, 1–1–1–0–0–0–1–1–0–0–1–0–1–0–0–1, and assuming that $O_1$ is set and primed by any suitable means prior to receipt of the first code bit, the operation is as follows. The first bit will operate on lead 72 to fire SCR5 which will cause the capacitor $C_5$ to charge through the path A–D, energizing the $N_C$ turns linking all the O cores and the $N_C$ turns linking the E cores of the upper branch of FIGURE 8 with an advance pulse. The $N_C$ turns on $O_1$ will cause the ONE therein to be transmitted to $E_1$ which is not under drive at this time. $E_1$ will then be set and, as $C_5$ recharges, it will be primed. As SCR5 is triggered, the OR circuit comprised of $D_6$–$D_7$ will operate to produce a pulse on the lead shown to the resistor $R_{11}$ to ground. This pulse will turn on transistor $Q_3$ through $C_9$, drawing current from the supply lead 70. Capacitor $C_{10}$ effectively decouples this operation from the prime circuit.

When $Q_3$ begins to conduct, a current flows through the winding $T_1$ in a sense to develop a current through the branch of $T_2$ to ground holding SCR6 off. The parameters of $T_1$, $T_2$ and $R_5$ are made such as to provide a pulse length, or on time for $Q_3$, greater than the time required between the first application of a trigger to leads 72–74 and the final operation of setting and priming resulting therefrom. When the circuit of $Q_3$ cuts off, due to becoming saturated, the collapsing field in $T_2$ reverses polarity and fires SCR6. The $Q_3$ circuit thus acts as a blocking oscillator to provide a delayed operation of SCR6 following each trigger input.

When SCR6 fires, an advance pulse is developed drawing current through $C_5$ which now recharges. This pulse operates through the path D–C to apply a clearing MMF to all E cores through turns $N_C$. This transfers the ONE in $E_1$ to $O_2$ which is then primed as $C_5$ discharges.

In this manner, a ONE bit is worked through the register to provide a detect output. If an erroneous code bit occurs, the register is cleared out. Thus, assuming the next bit to be a ZERO rather than a ONE, lead 74 will be energized to fire SCR4 and apply an MMF through the path D–B. This will cause the $N_C$ turns on the O cores, including $O_2$, to transmit. However, since the $N_C$ turns on $E_2$ are also energized at this time, the ONE transfer from $O_2$ will be blocked and lost. In this manner, erroneous codes are aborted, leaving the register cleared.

From the foregoing, it will be apparent that the invention embraces two types of detect code acceptance and two types of error code lock-out. In the word detector situation, a proper sequence advances a ONE bit by cancellation of clearing MMF on all cores, including the receiving core, by a selective setting MMF and blocks transfer by not cancelling the clearing MMF. The received pulse is thus overridden in the receiver core to prevent its progression. In the code stream detector circuit, a proper sequence is advanced by not developing a clearing MMF on the receiver core, and an improper sequence is blocked by selectively applying a clearing MMF on the receiver core to override the transmitted pulse. In both cases, the packaging scheme of the invention permits manual alteration of the detect sequence if desired. In both circuits, no operating power is required until trigger time, and long delays between trigger or between bits or words will not cause power loss. Since the first operation of the word and code stream circuits is by charging $C_5$, there is no criticality in maintaining a capacitor charge between bits or words.

In actual units, constructed in accordance with the invention, the following elements were used with a 28-volt battery supply:

| | |
|---|---|
| $L_1$ | 3.4 $\mu$h. |
| $L_2$ | 5.4 mh. |
| $C_1$, $C_2$, $C_3$, $C_6$, $C_7$, $C_8$, $C_9$ | 0.001 $\mu$f. |
| $C_5$ | 0.47 $\mu$f. |
| $C_4$, $C_{10}$ | 10 $\mu$f. |
| $R_1$, $R_2$, $R_3$ | 1000 ohms, ¼ watt. |
| $R_5$ | 7.5 ohms, ½ watt. |
| $R_4$ | 2.7 ohms. |
| $R_6$ | 5.6 ohms, ½ watt. |
| $R_7$ | 22,000 ohms, ¼ watt. |
| $R_8$, $R_9$, $R_{10}$ | 1000 ohms, ¼ watt. |
| $R_{11}$ | 4700 ohms, ¼ watt. |
| $R_{12}$ | 120 ohms, ¼ watt. |
| $D_1$ | Raytheon Inc., IN3730. |
| $D_2$, $D_3$, $D_4$ | Motorola Inc., IN4003. |
| $D_6$, $D_7$, $D_8$ | International Rectifier Corp., GO-1. |
| SCR1, SCR2, SCR3, SCR4, SCR5, SCR6 | Solids State Products, Inc., 2N1595. |
| $Q_1$, $Q_2$, $Q_3$ | RCA, 2N2270. |
| $T_1$ | 540 turns of No. 36 AWG. |
| $T_2$ | 270 turns of No. 36 AWG. |

On common Arnold Engineering Core No. A050056–2.

Having described our invention with an intent to teach a preferred mode of practice, we now claim it.

What is claimed is:

1. In a sequence detector for a sequence of binary ONE, ZERO intelligence, means for developing separate advance pulse inputs responsive to each ONE and each ZERO of a sequence of bits, a register of saturable magnetic cores having a bit capacity equal to the number of bits in the sequence to be detected and an auxiliary core, said auxiliary core being coupled to the first core of said register for serial transfer thereto, means to set said auxiliary core prior to the receipt of each bit of a sequence, means serially coupling the cores of said register to provide a path of transfer of a bit set into said auxiliary core to be advanced from core to core along said register to produce an output signal to evidence the occurrence of a proper sequence, first winding means linking certain of said cores to apply advance drive pulses thereto responsive to binary ONE inputs and second winding means linking others of the said cores to apply advance drive pulses thereto responsive to binary ZERO inputs in a winding pattern to respond to an input of binary ONE, ZERO bits in a proper sequence to cause the advance of the bit set into the auxiliary core through the register to provide an output signal and an input of a binary ONE, ZERO bits in all other sequences will result in the said set bit not being advanced through said register to thus produce no output signal.

2. The detector of claim 1 wherein the said first and second means are comprised of set turns and third means are included linking all of the register cores with clearing turns.

3. The detector of claim 1 wherein the said first and second means include turns linking the cores of the register with clearing turns, and third means are provided linking half the cores with clearing turns and fourth means are provided linking the other half of the cores with clearing turns.

4. The detector of claim 1 wherein the cores are multiapertured cores and there is provided a prime drive to prime said cores for transfer, the said prime drive including winding turns adapted to drive said means to set said auxiliary core.

5. In a word detector for detecting the occurrence of a binary ONE-ZERO word, the combination including a saturable magnetic core register having a bit position for each bit of the word to be detected with the register cores being coupled for serial transfer, an advance drive coupling the register cores including a first winding having clearing turns linking all bit positions and second and third windings having set turns linking respectively half the bit positions, the said first winding being in series with the second and third windings which are in parallel, means for applying the binary ONE bits of a word to effect drive through said first and second windings, and means for applying the binary ZERO bits of a word to effect drive through said first and third windings, the windings being related to the word to be detected to block transfer through said register upon the occurrence of a single erroneous bit in a word applied to said windings.

6. The detector of claim 5 wherein there is included a fourth winding linking all said cores with clearing turns adapted to reset said register to an all ZERO content responsive to signals between words.

7. The detector of claim 6 wherein there is provided an auxiliary bit position and means to develop a ONE input to said register between each word bit input.

8. In a code stream detector for detecting the occurrence of a sequence of binary ONE-ZERO bits, the combination of a register of saturable magnetic cores arranged in odd and even groups, an odd and even core forming a bit position with the register having a number of bit positions equal to the number of bits in the sequence to be detected, means to set a ONE into said register prior to each sequence bit, an advance drive coupling said cores including a winding linking the odd cores and a winding linking the even cores, a further drive linking the cores of the even group with clearing turns in first and second parallel patterns each in series with the advance drive linking the odd cores, means responsive to ONE bits to energize the first pattern and means responsive to ZERO bits to energize the second pattern, further means responsive to each ONE and ZERO bits to energize the winding linking the cores of the even group, and further means including means to delay operation thereof until after transfer to the core of the even group, the said patterns being related to the sequence to be detected whereby to destroy the transfer of the ONE set into the register responsive to a wrong bit sequence.

9. The device of claim 8 wherein said means to delay said further means is an oscillator driven by the ONE and ZERO bits of the sequence to be detected.

10. In a sequence detector for detecting the occurrence of a sequence of binary ONE and ZERO bits, first means responsive to a sequence of ONE, ZERO bits to produce a first advance pulse responsive to each ONE bit of a sequence and a separate second advance pulse responsive to each ZERO bit, a register of magnetic cores and means to set the first core of said register independent of code input, windings coupling said cores for serial transfer of a set state from the first core of said register to the last core of said register, an output winding on the last core of said register operable to produce an output detect signal upon said last core being set, a first advance winding serially coupling certain of said cores and a second advance winding serially coupling others of said cores, said first advance winding being connected to the said first means for impressing an advance MMF on coupled cores responsive to ONE bit inputs and said second winding being connected to said first means for impressing an advance MMF on coupled cores responsive to ZERO bit inputs in a sense to transfer a set state stored in a core to an adjacent core, the said first and second windings linking said cores in distinctive patterns to successively advance a set state in the first core to the last core in response to a given sequence of advance pulses developed by said drivers responsive to a ONE, ZERO binary code sequence input and to effectively block the transfer of the set state through the said cores in response to all other sequences of advance pulses developed by said drivers responsive to other ONE, ZERO binary code sequences.

11. The detector of claim 10 including means mounting said cores in a side-by-side relationship, a plurality of terminals affixed to said means, the said first and second windings linking said cores each being comprised of a series of lengths of wire threaded through a given core with each end of the wire terminated to a terminal post and with the various said wires being inter-connected serially to form said patterns and facilitate changes of wires from post to post to alter said patterns and provide a response to a different ONE, ZERO binary sequence.

12. The detector of claim 10 including a power supply for said drivers and means to energize said power supply only upon receipt of a code sequence input whereby to avoid power drawn between bit inputs.

References Cited

UNITED STATES PATENTS

| | | |
|---|---|---|
| 3,096,509 | 7/1963 | Rosenberg et al. |
| 3,138,788 | 6/1964 | Nitzan et al. |
| 2,700,150 | 1/1955 | Wales. |
| 3,243,775 | 3/1966 | English. |
| 3,298,004 | 1/1967 | Smith. |
| 3,299,401 | 1/1967 | Bolton. |
| 3,327,290 | 6/1967 | English. |
| 3,334,337 | 8/1967 | Mallery. |
| 3,341,832 | 9/1967 | Nitzan. |

STANLEY M. URYNOWICZ, Jr., *Primary Examiner.*

U.S. Cl. X.R.

340—146.2